Sept. 16, 1947.    H. C. HILL    2,427,407
AUTOMATIC SPARK CONTROL
Filed June 6, 1944    3 Sheets-Sheet 3

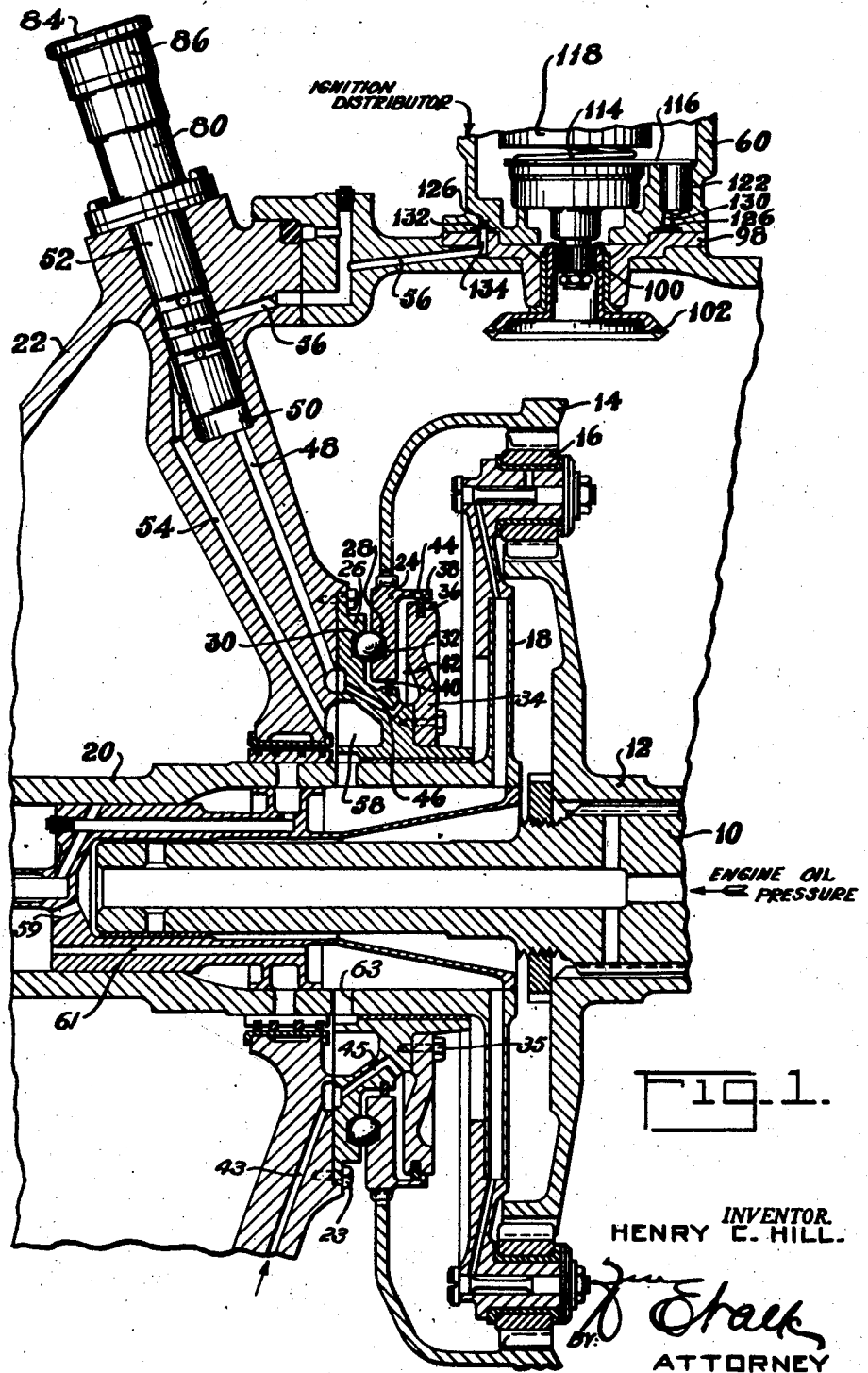

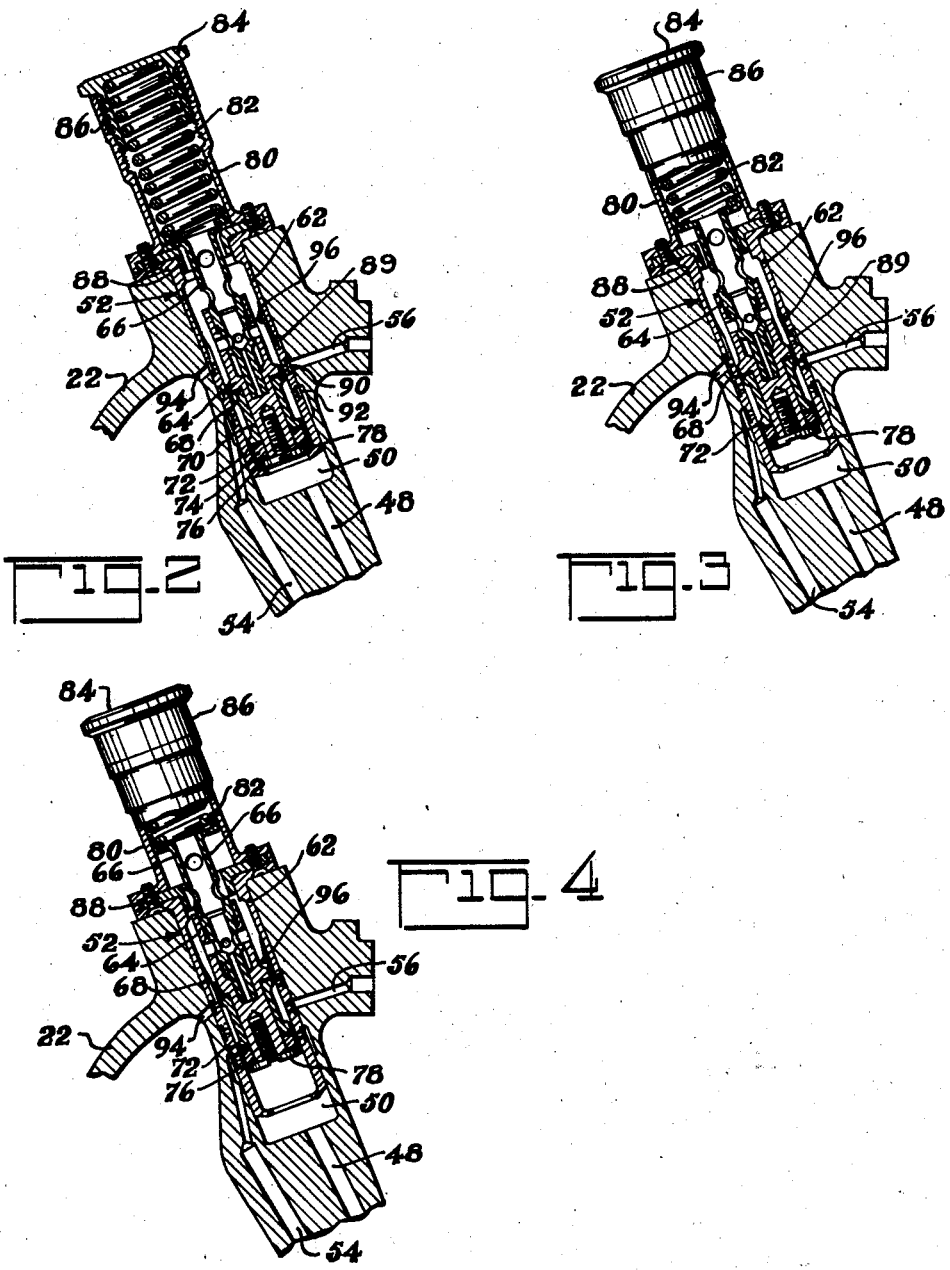

INVENTOR.
HENRY C. HILL.
BY
ATTORNEY

Patented Sept. 16, 1947

2,427,407

UNITED STATES PATENT OFFICE 2,427,407

AUTOMATIC SPARK CONTROL

Henry C. Hill, Montclair, N. J., assignor to Wright Aeronautical Corporation, a corporation of New York Application June 6, 1944, Serial No. 538,963

10 Claims. (Cl. 123—117)

1

This invention relates to internal combustion engines, and more particularly to automatic means for adjusting the ignition timing thereof.

In the operation of an internal combustion engine for an aircraft, it is desirable to retard the ignition timing in order to facilitate engine starting and to retard the ignition timing under engine idling conditions in order to permit the engine to idle at low speeds. Under cruising conditions, the ignition spark is advanced in order to conserve fuel, and under high-power take-off or climbing conditions the ignition spark is retarded in order to inhibit detonation of the ingine. Prior automatic ignition timing systems employed engine manifold pressure and/or engine speed in order to control the ignition timing. However, theoretically, the ignition timing should be adjusted in accordance with the mean effective pressure within the engine cylinders, since this pressure is a major factor in determining the detonation characteristics of the engine. This pressure is substantially proportional to the torque transmitted by the engine, regardless of the engine speed or the altitude of the engine. Accordingly, it is an object of this invention to automatically control the ignition timing of the engine in accordance with changes in the torque transmitted by the engine. It is a further object of this invention to control the ignition timing in response to changes in a fluid pressure which varies with the engine torque.

Specifically, the invention comprises a valve movable in response to a fluid pressure which varies with the engine torque, said valve having three positions corresponding to low, medium and high engine torques, and being operative to effect adjustment of the ignition timing so as to retard the spark at low and high engine torques and to advance the spark at intermediate engine torques.

Other objects of this invention will become apparent upon reading the annexed detailed description in connection with the drawing in which:

Figure 1 is a partial axial sectional view through an engine embodying the invention;

Figures 2, 3 and 4 are detail sectional views illustrating the control valve in different control positions;

Figure 1A:
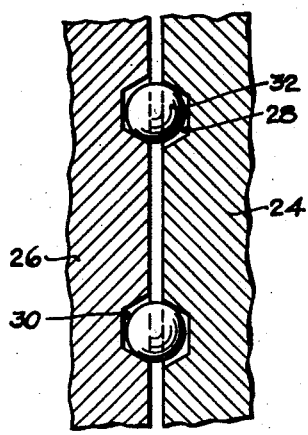
Figure 1A is a developed sectioned view through the torque meter rollers and conical pockets.

Referring to the drawing, an internal combustion engine is provided with a crank shaft 10 having a gear 12 splined thereto. The gear 12 comprises the annular driving gear of a planetary reduction gear unit including an annular internal reaction gear 14 and a plurality of circumferentially spaced planet pinions 16. The planet pinions 16 are carried by a spider construction 18 on a propeller shaft 20. Instead of securing the reaction gear 14 directly to the front crank case section 22, there is interposed therebetween, a torque responsive mechanism comprising an annular back plate 24 splined to the reaction gear 14 and an annular thrust plate 26 rigidly secured to the crank case section 22, e. g., by screws 23. The back and thrust plates are each provided with a plurality of circumferentially spaced and facing conical pockets 28 and 30 respectively within which spherical rollers 32 are disposed, as best seen in Figure 1A.

The thrust plate 26 is rigidly secured to the crankcase section 22, and is provided with an annular radial extension 34 secured thereto, e. g., by screws 35. Said radial extension 34 has a seal ring 36 engageable with an annular axial extension 38 at the outer periphery of the back plate 24. A seal ring 40 is also provided between the thrust plate 26 and the inner periphery of the back plate, thereby defining an annular cylindrical space 42 relative to which the back plate 24 may move axially. When torque is transmitted through the planetary reduction gear unit to the engine propeller shaft 20, the reaction between the rollers 32 and the walls of their conical pockets is such that they urge the back plate 24 axially to the right as viewed in Figure 1. Fluid under pressure is supplied to the cylindrical space 42 to balance this axial reaction of the back plate 24. If the engine oil pressure is sufficient, it may be supplied directly to the cylindrical space 42, or if this pressure is not sufficient, a booster pump may be employed to increase the pressure of the engine oil supplied to the cylindrical space 42. Thus as illustrated, oil pressure is supplied to the cylindrical space 42 through passages 43 and 45 which preferably are supplied with oil pressure from a booster pump (not shown). In either case, the axial force tending to move the back plate 24 to the right is balanced against the fluid pressure admitted to the cylindrical space 42 through passages not shown. An escape port 44 is provided in the axial back plate extension 38 for the fluid in the cylindrical space 42 and the seal ring 36 acts as a valve, controlling the escape of fluid pressure through the port 44 upon axial movement of the back plate.

With this arrangement, the reaction gear 14 is yieldably anchored to the crankcase by the balls 32 disposed in the conical pockets 28, 30. When torque is applied to the reaction gear 14, the gear 14, and the back plate 24 splined thereto, rotate slightly, and as a result of the cooperation between balls 32 and the walls of their individual conical pockets, the back plate 24 also moves axially to right against the fluid pressure within the cylindrical space 42. This axial movement of the back plate 24 controls the size of the oil escape passage through the port 44, thereby regulating the magnitude of the fluid pressure within the cylindrical space 42. Accordingly, when the torque impressed on the reaction gear 14 increases, the back plate 24 moves axially to the right to close the escape port 44 until the fluid pressure within the cylinder 42 increases sufficiently to balance the rightward torque reaction on the back plate. Similarly, upon a decrease in the engine torque, the fluid pressure in the cylinder 42 will then be greater than the axial torque reaction on the back plate 24, thereby moving the back plate to the left to effect a slight opening adjustment of the escape port 44 until the fluid pressure has been reduced to the point at which it just balances the reduced torque reaction. Therefore, the magnitude of the fluid pressure within the cylindrical space is a continuous measure of the torque being transmitted by the engine. The structure so far described is quite conventional and is somewhat similar to the torque meter disclosed in Patent No. 2,289,285 to R. Chilton.

The torque responsive pressure within the cylindrical space 42 is transmitted through passage 46 and 48 to a bore 50 within which a piston-type valve 52 is disposed. The valve 52 is adapted to open or close the connection between a pair of passages 54 and 56. Engine oil pressure is supplied to the passage 54 from an annulus 58, while the passage 56 extends to an ignition distributor within a housing 60. When the valve 52 establishes communication between the passages 54 and 56, the pressure within the passage 56 is operative to adjust the distributor to advance the ignition timing, while when the valve 52 closes the passage 54, the ignition timing is retarded as hereinafter described. Engine oil pressure may be supplied to the annulus 58 via passages 59 and 61 and radial drillings 63 from the interior of crankshaft 10, engine lubricating oil being supplied to the interior of the crankshaft for lubrication of crankshaft bearing surfaces as is conventional practice.

Figure 5:
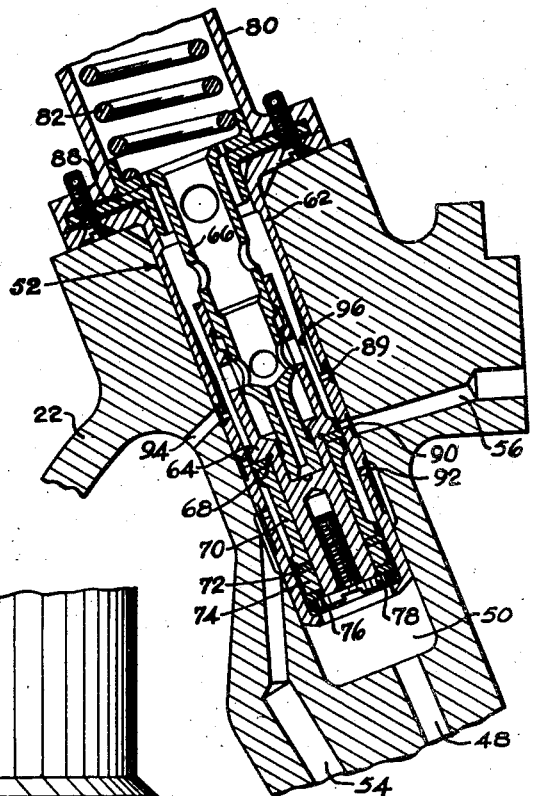
Figure 5 is an enlarged sectional view of a portion of Figure 2.
Figure 6:
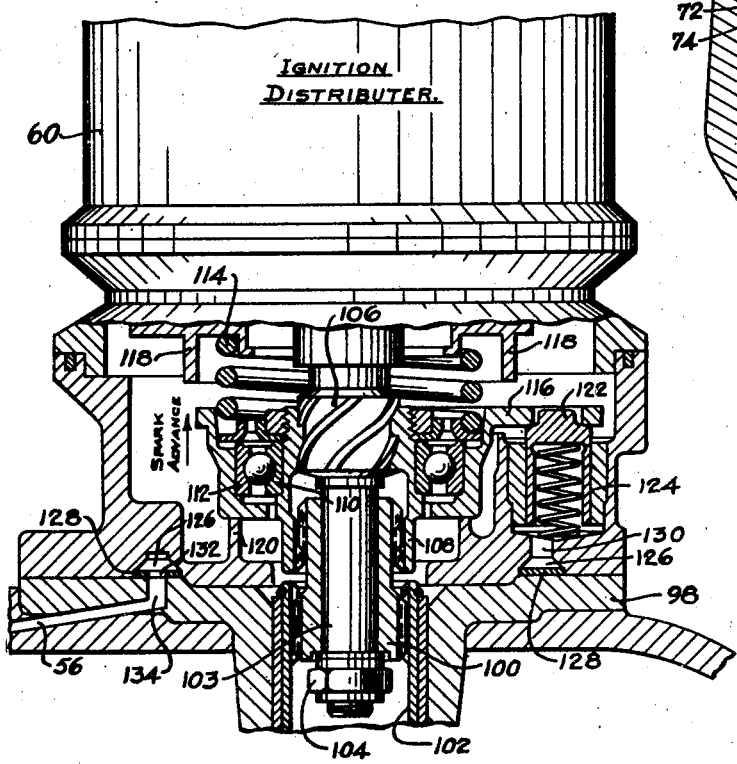
Figure 6 is a partial sectional view illustrating the timing control mechanism.

Referring now to Figures 2 and 5, the valve 52 comprises a sleeve 62 secured to the crank case 22 and within which a piston-type valve means is slidable. For assembly reasons, the piston-type valve means comprises inter-fitted members 64 and 66. The valve member 64 is provided with an inwardly facing shoulder against which a seal ring 68 is disposed. A spacer member 70, a second seal ring 72, a second spacer member 74 and a third seal ring 76 are serially disposed in the order stated about the valve member 64 as illustrated. A screw bolt 78 serves to hold the three seal rings and their interposed spacer members in position against the shoulder on the valve member 64.

The valve member 66 is slidably fitted within a tubular housing 80 which forms an axial extension of the sleeve 62. A spring 82 is disposed between the cap 84 at the outer end of the housing 80 and the valve member 66. A suitable spacer member 86 between the cap 84 and housing 80 determines the initial compression of the spring 82.

With this arrangement, when the torque responsive fluid pressure within the passage 48 and bore 50 is below a predetermined value as determined by the initial compression of the spring 82, the spring 82 urges the piston valve members to their extreme inward positions. As the torque responsive fluid pressure increases above this predetermined value, the piston valve members are moved outwardly against the spring 82, the position of the piston valve members depending on the magnitude of the torque responsive fluid pressure. A stop collar 88 is secured between the sleeve 62 and housing 80. This stop collar is engageable by the outer end of the valve member 64 to limit the outward travel of the valve against the valve spring 82.

The sleeve 62 is also provided with three axially spaced external annular grooves 89, 90 and 92, and a plurality of radial openings extend from each of these grooves to the interior of the sleeve 62. The oil pressure passage 54 is in communication with the annular groove 92, and the distributor passage 56 extends to the ignition timing control apparatus from the groove 90. A drain passage 94 opens into the crank case from the annular groove 89.

In Figures 1 and 2, the piston-type valve 64, 66 is in its innermost position, that is, the engine torque responsive pressure is below a predetermined value. In this condition of the valve, the engine oil pressure within the passage 54 opens into the annular space between the seal rings 68 and 72 and is closed thereby, while the distributor passage 56 is in communication with the drain passage 94 through the annular space between the sleeve 62 and the valve members therein. With the distributor passage 56 thus vented to the crankcase, the ignition is retarded as hereinafter described.

As the engine torque increases, the torque responsive pressure increases in proportion thereto and the piston-type valve members are forced outwardly by said pressure against the spring 82. When the torque responsive pressure reaches an intermediate value, the piston-type valve members occupy the position illustrated in Figure 3. In this position, the annular space between the seal rings 68 and 72 places the passages 54 and 56 in communication, whereupon engine oil pressure is supplied to the passage 56. At the same time, the seal ring 68 now prevents communication between the distributor passage 56 and the drain passage 94. The engine oil pressure in passage 56 is now operative to advance the ignition timing.

When the engine torque increases above a predetermined high value, the torque responsive pressure is operative to force the piston valve members outwardly to the position illustrated in Figure 4, in which the annular space between the seal rings 68 and 72 now places the distributor passage 56 and the drain passage 94 in communication, while the seal rings 72 and 76 now close the engine oil pressure passage 54. Thus the distributor passage 56 is again vented to the crankcase and the ignition timing is retarded. The stop member 88 prevents the piston valve members from being forced outwardly beyond the relative position of the seal rings and the fluid passages 54, 56 and 94 illustrated in Figure 4, even though the engine torque increases to a still higher value.

The passage 94 also serves to drain the rear side of the piston members 64 and 66 to prevent liquid from being trapped therebehind. A series of axial grooves 96 on the interior of the sleeve 62 extend outwardly from the radial openings in the sleeve, communicating with the external annular groove 89 in order that when the seal ring 68 moves outwardly beyond these openings as illustrated in Figure 4, the rear side of the piston members is still vented through the drain passage 94.

Referring now to Figures 1 and 5, the ignition distributor 60 comprises a housing secured to the engine crank case over a mounting pad 98. The distributor drive sleeve 100 is splined to an engine driven gear 102, supported by the mounting pad 98. The sleeve 100 is loosely carried by the distributor drive shaft 103 between a nut 104 and helical splines 106 on the drive shaft. A sleeve 108 is provided with an axially slidable spline connection with the drive sleeve 100, and is provided with helical splines meshing with the helical splines 106 on the distributor drive shaft 103, thereby drivably connecting the distributor shaft 102 and driving sleeve 100. With this arrangement, the relative angular relation between the distributor shaft 103 and the distributor drive sleeve 100 may be varied by axial movement of the sleeve 108, thereby adjusting the ignition timing.

In order to adjust the sleeve 108, this sleeve is secured to the inner race 110 of a ball bearing, and the outer race 112 of this bearing is disposed between a spring 114 and a thrust plate 116. The distributor housing is provided with annular stop flanges 118 and 120 to limit the axial movement of the thrust plate 116. The spring 114, through the bearing 110, 112, urges the plate 116 downwardly against the flange 120, thereby moving the sleeve 108 to its lowermost position. In order to move the sleeve 108 upwardly, a plurality of circumferentially spaced pistons 122 are adapted to engage the plate 116. The pistons 122 are slidably received within bores 124 within the distributor housing. An annular groove 126 about the exterior mounting surface of the distributor housing is covered by a plate 128, and each bore 124 is in communication with the annular groove 126 through a passage 130. The plate 128 is provided with an opening 132, and a passage 134 through the mounting pad establishes communication between the fluid pressure passage 56 and the annular groove 126, through the opening 132.

With this construction, when fluid pressure is supplied to the passage 56, the pistons 122 are operated to move the thrust plate 116 upwardly against the spring 114, until the plate abuts against the stop flange 118. The oil pressure supplied through the passage 54 is sufficient to raise the distributor thrust plate 116 whenever, during engine operation, the torque responsive pressure is sufficient to raise the valve 52 to connect the passages 54 and 56. This upward movement of the plate 116 carries the ball bearing 110, 112 with it, to raise the sleeve 108, thereby changing the relative angular relation between the distributor shaft 103 and the distributor drive sleeve 100. The arrangement is such that upward movement of the thrust plate 116 advances the ignition timing. When the fluid pressure in passage 56 is relieved, the spring 114 forces the thrust plate 116 downwardly against the stop flange 120, thereby downwardly moving the sleeve 108 and restoring the prior relative angular relation between the distributor drive shaft 103 and the distributor driving sleeve 100 to retard the ignition timing.

With the above described system, when the engine torque is below a predetermined value, the torque responsive pressure supplied to the valve 52 is insufficient to raise the valve, as illustrated in Figure 2, whereupon the oil pressure passage 54 is closed, and the distributor passage 56 is vented to the crank case. As a result, the spring 114 within the distributor is operative to lower the thrust plate 116 against the stop 120 to retard the ignition timing, thereby facilitating engine starting and permitting low speed idling operation. When the engine torque reaches an intermediate range, the torque responsive pressure is operative to raise the valve 52 to the intermediate position illustrated in Figure 3, whereupon the engine oil pressure is placed in communication with the distributor passage 56. The oil pressure in passage 56 is then operative to raise the thrust plate 116 against the stop 118 to advance the ignition timing, whereby the engine is operated with minimum fuel consumption. When the engine torque exceeds a predetermined value, the torque responsive pressure raises the valve 52 to the position illustrated in Figure 4, and in this position, the distributor passage 56 is again vented to the crankcase to retard the ignition timing in order to inhibit detonation of the engine at high engine torques. Instead of abruptly retarding the ignition timing after the engine torque exceeds a predetermined value, it is also contemplated that the ignition timing may be progressively retarded from its advanced position as the engine torque increases.

While I have described my invention in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination with an internal combustion engine, a transmission connected thereto including a torque reaction member, automatically adjustable ignition timing means for said engine, means responsive in its operation to changes in the torque to which said reaction member is subjected during engine operation, and means controlled by said responsive means for automatically adjusting said ignition timing means.

2. In combination with an internal combustion engine, a transmission connected thereto including a torque reaction member, automatically adjustable ignition timing means for said engine, means responsive in its operation to changes in the torque to which said reaction member is subjected during engine operation, and means controlled by said responsive means for automatically adjusting said ignition timing means so as to retard the ignition timing when said torque is above or below an intermediate range and to advance said ignition timing when said torque is within said range.

3. In combination with an internal combustion engine, a transmission connected thereto including a reaction member, a source of fluid pressure, valve means adjustable to control the application of said fluid pressure for regulating the ignition timing of said engine, and means responsive to the torque to which said reaction member is subjected for adjusting said valve means.

4. In combination with an internal combustion engine, a transmission connected thereto including a torque reaction member, a source of fluid pressure, valve means adjustable to control the application of said fluid pressure for advancing or retarding the ignition timing of said engine, and means responsive to the torque to which said reaction member is subjected for adjusting said valve means to retard the ignition timing when said reaction member torque is above or below an intermediate range and to advance said ignition timing when said reaction member torque is within said range.

5. In combination with an internal combustion engine, a transmission including a reaction member, a first source of fluid pressure, means for automatically controlling the magnitude of said fluid pressure in accordance with the torque imposed on said reaction member, a second source of fluid pressure, and valve means automatically adjustable by said first fluid pressure for controlling the application of said second fluid pressure for regulating the ignition timing of said engine.

6. In combination with an internal combustion engine, a transmission including a reaction member, a first source of fluid pressure, means for automatically controlling the magnitude of said fluid pressure in accordance with the torque imposed on said reaction member, a second source of fluid pressure, and valve means automatically adjustable by said first fluid pressure for controlling the application of said second fluid pressure to retard the ignition timing of said engine when said first fluid pressure is above or below an intermediate range and to advance said ignition timing when said first fluid pressure is within said range.

7. In combination with an internal combustion engine, engine power transmission means, automatically adjustable ignition timing means for said engine, means responsive in its operation to changes in the torque transmitted by said first mentioned means, and means controlled by said responsive means for automatically adjusting said ignition timing means.

8. In combination with an internal combustion engine, engine power transmission means, automatically adjustable ignition timing means for said engine, means responsive in its operation to changes in the torque transmitted by said first mentioned means, and means controlled by said responsive means for automatically adjusting said ignition timing means so as to retard the ignition timing when said torque is above or below an intermediate range and to advance said ignition timing when said torque is within said range.

9. In combination with an internal combustion engine, engine power transmission means, a source of fluid pressure, a valve member movable to control the application of said fluid pressure for regulating the ignition timing of said engine, and means operative in response to changes in the torque transmitted by said first-mentioned means for moving said valve member to retard said ignition timing when said torque is above or below an intermediate range and to advance said timing when said torque is within said range.

10. In combination with an internal combustion engine, engine power transmission means, a first source of fluid pressure, means for automatically controlling the magnitude of said first fluid pressure in accordance with changes in the torque transmitted by said first-mentioned means, a second source of fluid pressure, and valve means automatically movable in response to changes in said first fluid pressure for controlling the application of said second fluid pressure for adjusting the ignition timing of said engine.

HENRY C. HILL.

REFERENCES CITED

The following references are of record in the file of this patent:

UNITED STATES PATENTS

| Number | Name | Date |
| --- | --- | --- |
| 2,309,226 | Udale | Jan. 26, 1943 |
| 2,097,776 | Prentice | Nov. 2, 1937 |
| 1,839,447 | Stanton | Jan. 5, 1932 |